T. MASUDA.
AUTOMOBILE FENDER.
APPLICATION FILED AUG. 8, 1917.

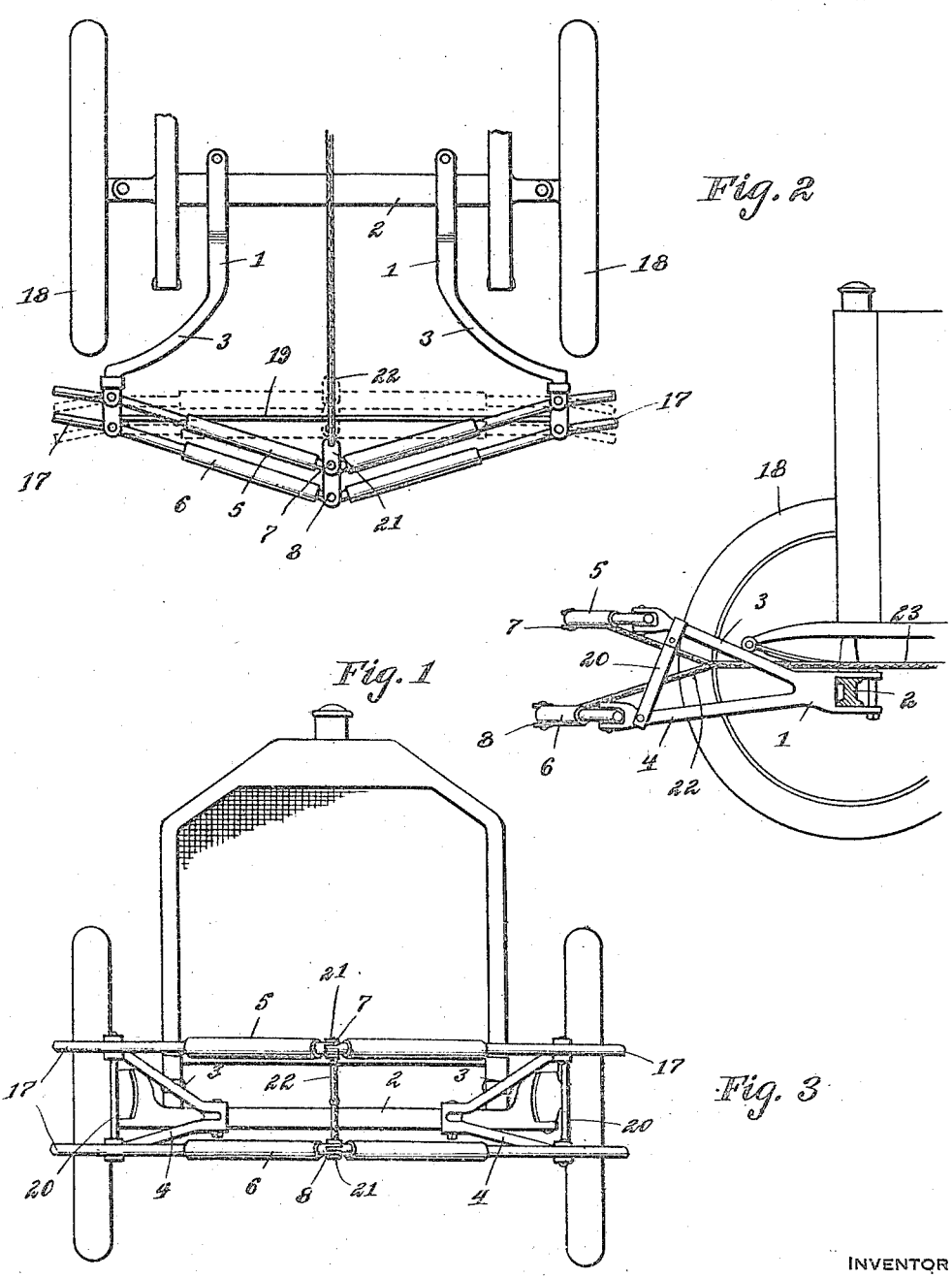

1,248,366.

Patented Nov. 27, 1917.
2 SHEETS—SHEET 2.

WITNESSES
C. F. Rudolph
P. M. Smith

INVENTOR
Taichiro Masuda,
BY Victor J. Evans
ATTORNEY

UNITED STATES PATENT OFFICE.

TAICHIRO MASUDA, OF MARYSVILLE, CALIFORNIA.

AUTOMOBILE-FENDER.

1,248,366.  Specification of Letters Patent.  Patented Nov. 27, 1917.

Application filed August 8, 1917. Serial No. 185,130.

*To all whom it may concern:*

Be it known that I, TAICHIRO MASUDA, a citizen of the Japanese Empire, residing at Marysville, in the county of Yuba and State of California, have invented new and useful Improvements in Automobile-Fenders, of which the following is a specification.

This invention relates to fenders for motor vehicles, the object in view being to provide a fender which involves a material improvement over the ordinary bumper bars or pilot bars now used on a great many motor vehicles in that the improved fender will not knock down a person struck thereby but will first trip such person and then easily thrust him to one side or the other of the machine so that he will not be struck by the wheels of the vehicle and run over.

A further object of the invention is to produce a fender having the characteristics and merits above referred to, which fender may be economically manufactured and sold for a comparatively reasonable amount.

With the above and other objects in view, the invention consists in the novel construction, combination and arrangement of parts, herein fully described, illustrated and claimed.

In the accompanying drawings:—

Figure 1 is a side elevation of a portion of a motor vehicle, illustrating the improved fender in its applied relation thereto.

Fig. 2 is a plan view of the same.

Fig. 3 is a front elevation thereof.

Figure 4:
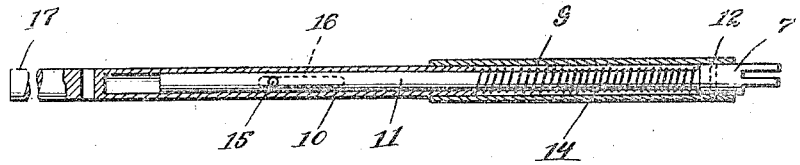
Fig. 4 is an enlarged longitudinal section through one of the telescopic pilot bars.
Figure 5:
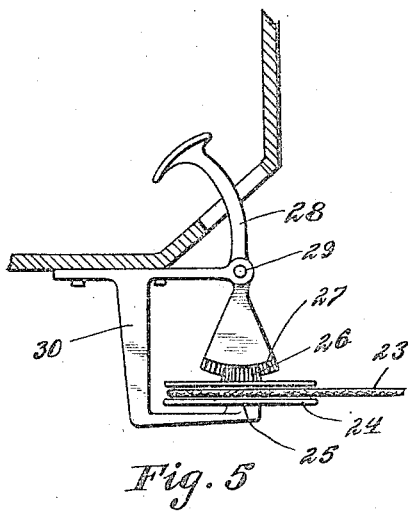
Fig. 5 is a detail view of the fender retracting means.
Figure 6:
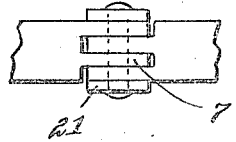
Fig. 6 is a fragmentary view showing one of the knuckle joints.
Figure 7:
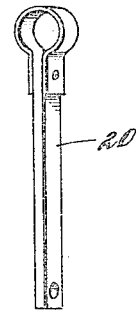
Fig. 7 is a fragmentary view showing one of the vertical struts.

In carrying out the present invention, I provide a suitable mounting connection between the improved fender and a part of the vehicle. As illustrated in the drawings, in one embodiment of the supporting means for the fender, I employ a pair of supporting arms 1 which are illustrated as fastened in rigid relation to the front axle 2 of the vehicle. The forward ends of the supporting arms are forked to provide upper fork arms 3 and lower fork arms 4 the extremities of which are extended in a forward direction to receive the pilot bars and arranged in different vertical and horizontal planes as clearly indicated in Fig. 1.

In the preferred embodiment of the invention, I employ an upper pilot bar 5 and a lower pilot bar 6 arranged in different vertical and horizontal planes, the lower pilot bar 6 being located slightly in advance of the upper pilot bar. This is done in order to avoid knocking down the person struck by the fender as the lower pilot bar will come in contact with such person before the upper pilot bar. The pilot bars 5 and 6 are pivotally connected at each end to the fork arms 3 and 4 and each of said pilot bars comprises two sections of telescopic construction as illustrated in the detail view in Fig. 4. The sections of the pilot bar 5 and also the sections of the pilot bar 6 converge toward their forward meeting ends where they are connected together by knuckle joints 7 and 8. Each of the pilot bars, in the preferred construction thereof, comprises an outer tubular member 9, an inner tubular member 10 and a guide rod or plunger 11 which is positioned within the outer tubular member 9 and fixedly connected by means of a pin 12 to the adjacent section of the knuckle joint 7 or 8. A compression spring 14 encircles the rod 11, bearing at one end against the knuckle section and bearing at its opposite extremity against the adjacent end of the inner tubular member 10. Guide pins 15 project from the rod 11 and work back and forth in the guide slots 16 in the tubular member 10 thus preventing relative rotation of the members 9 and 10. The pilot bar extensions 17 extend from the knuckle joints 7 outwardly in front of the steering wheels 18 of the vehicle so as to prevent said wheels from striking any person in front of the vehicle.

19 designates a tie rod which extends horizontally and is fixedly connected at its extremities to the lower fork arms 4. Substantially vertical struts 20 serve to hold the upper and lower pilot bars in a certain spaced relation to each other. Connected to the pivots 8 of the upper and lower pilot bars are hooks or clevises 21 from which flexible connections 22 such as chains or cables extend rearwardly where they are joined into a single chain or cable 23 which passes around and is fastened to a pulley 24. The pulley 24 is journaled on a vertical stud shaft 25 and has in fixed relation thereto a gear 26. A sector gear 27 meshes with the gear 26 and is carried by the lower end of a manually controlled lever 28 which is mounted pivotally at 29 on a fixed support 30 secured to the vehicle frame. It will now be understood that the operator by rocking the lever 28 may rotate the pulley 24 and thereby pull rearwardly on the hooks or clevises 21 thereby causing the pilot bars 5 and 6 to assume the dotted line position shown in Fig. 1. In congested districts the operator may relax the cable or connection 23 and permit the telescopic pilot bars 5 and 6 to assume the full line position shown in Fig. 2.

From the foregoing description taken in connection with the accompanying drawings it will now be understood that the pilot bars 5 and 6 provide for a flexible or yielding impace when a person is struck by the fender, thereby cushioning the blow, and preventing injury to such person. The pilot bars subsequently react on the person struck, by the expansive action of the springs 14, and as said pilot bars are inclined toward one side or the other of the vehicle, the person is thrust to one side or the other out of the path of the body of the vehicle and the wheels thereof without injury. The fender involves the use of a small number of parts capable of being easily manufactured, the fender being adapted to be mounted upon any present day motor vehicle with slight changes in the formation of the supporting arms 1.

I claim:—

1. The combination with a motor vehicle, of a fender embodying upper and lower sets of pilot bars, the bars of each set converging toward a central point where they are pivotally connected, supporting means secured to a part of the vehicle frame and having said pilot bars pivotally connected thereto, each of said pilot bars embodying telescopic members, and a compression spring housed within each pilot bar and acting to extend the same longitudinally.

2. The combination with a motor vehicle, of a fender embodying upper and lower sets of pilot bars, the bars of each set converging toward a central point where they are pivotally connected, supporting means secured to a part of the vehicle frame and having said pilot bars pivotally connected thereto, each of said pilot bars embodying telescopic members, a compression spring housed within each pilot bar and acting to extend the same longitudinally, and flexible means for restricting the expansive action of said spring.

3. The combination with a motor vehicle, of a fender embodying upper and lower sets of pilot bars, the bars of each set converging toward a central point where they are pivotally connected, supporting means secured to a part of the vehicle frame and having said pilot bars pivotally connected thereto, each of said pilot bars embodying telescopic members, a compression spring housed within each pilot bar and acting to extend the same longitudinally, and manually controlled means for moving the pivotally connected forward extremities of said pilot bars rearwardly, said means comprising a flexible connection attached to said forward extremities of the pilot bars, and a rotatable pulley around which said flexible connection passes and to which it is attached.

4. The combination with a motor vehicle, of a fender embodying upper and lower sets of pilot bars, the bars of each set converging toward a central point where they are pivotally connected, supporting arms secured to a part of the vehicle frame and having said pilot bars pivotally connected thereto, each of said pilot bars embodying telescopic members, and a compression spring housed within each pilot bar and acting to extend the same longitudinally, said supporting arms being forked to provide upper and lower fork arms to which the upper and lower pilot bars are attached.

5. The combination with a motor vehicle, of a fender embodying upper and lower sets of pilot bars, the bars of each set converging toward a central point where they are pivotally connected, supporting means secured to a part of the vehicle frame and having said pilot bars pivotally connected thereto, each of said pilot bars embodying telescopic members, a compression spring housed within each pilot bar and acting to extend the same longitudinally, and pilot bar extensions at the opposite extremities of said telescopic pilot bars, said extensions projecting in front of the steering wheels of the vehicle.

In testimony whereof I affix my signature.

TAICHIRO MASUDA.